W. E. BOCK.
MACHINE FOR MAKING GLASS ARTICLES.
APPLICATION FILED JAN. 11, 1904. RENEWED FEB. 4, 1908.

919,120.

Patented Apr. 20, 1909.
5 SHEETS—SHEET 1.

FIG. 1.

WITNESSES

INVENTOR
WILLIAM E. BOCK.
BY
ATTY.

W. E. BOCK.
MACHINE FOR MAKING GLASS ARTICLES.
APPLICATION FILED JAN. 11, 1904. RENEWED FEB. 4, 1908.

919,120.

Patented Apr. 20, 1909.
5 SHEETS—SHEET 3.

WITNESSES

INVENTOR
· WILLIAM · E · BOCK ·
BY
ATT'Y.

UNITED STATES PATENT OFFICE.

WILLIAM EMIL BOCK, OF TOLEDO, OHIO, ASSIGNOR TO THE TOLEDO GLASS COMPANY, OF TOLEDO, OHIO, A CORPORATION OF OHIO.

MACHINE FOR MAKING GLASS ARTICLES.

No. 919,120.   Specification of Letters Patent.   Patented April 20, 1909.

Application filed January 11, 1904, Serial No. 188,582. Renewed February 4, 1908. Serial No. 414,258.

*To all whom it may concern:*

Be it known that I, WILLIAM EMIL BOCK, residing at Toledo, in the county of Lucas and State of Ohio, a citizen of the United States, have invented certain new and useful Improvements in Machines for Making Glass Articles, of which the following is a specification, reference being had therein to the accompanying drawings.

The invention relates to new and useful improvements in a machine for making glass articles.

The invention comprises a machine in which a mold is moved into operative relation to the exit from a tank or pot containing molten glass so that the glass therein may fall or flow from the tank and be caused to fill or supply the necessary glass to the mold for making a blowing blank, also such mechanism as will shape the charge of glass into a blowing blank and subsequently expand it into the article to be made.

The invention further consists in such a machine in which the inlet or fill opening of the mold is uppermost, the mold being in an inverted position combined with mechanism for reversing the mold to its upright position, and expanding the blank after it has been thus turned.

The invention further consists in the peculiar construction of the pot or tank by which the glass may be caused to flow at the desired speed to the molds and further in the construction, arrangement and combination of the various parts as more fully hereinafter described, and particularly pointed out in the claims.

1 represents the base which supports the operating parts of the machine.

2 is a short tubular standard supported on the base within which is the rotating tubular post or standard 3, supported upon the base 1.

Figure 1:
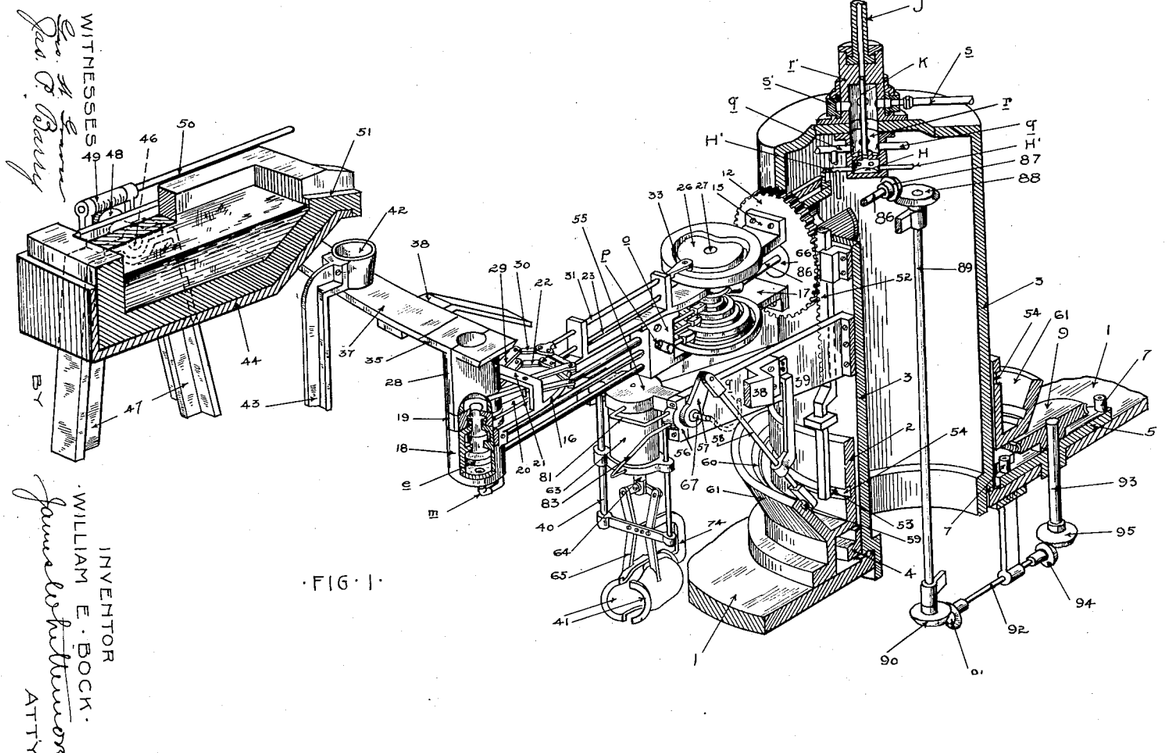
Figure 1 is a perspective view of one arm of the machine, of which there are to be a multiple showing the mold just coming into position to be filled. The tank or pot is shown in section as is also the standard which supports and carries the mold arms. Some of the parts are broken away to better illustrate the connections.
Figure 9:
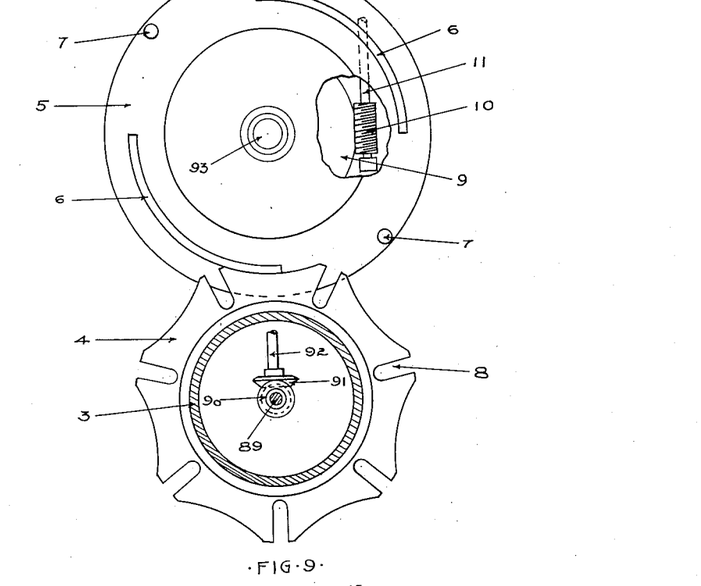
Fig. 9 is a plan view of the star wheel and the index wheel by means of which the mold arms are caused to intermittently travel or move.

On the outside of the tubular post 3 is secured a star wheel 4 shown in Figs. 1 and 9 adapted to be actuated intermittently and locked between operations by means of the index wheel 5 which engages in the curved bearings 6 of the star wheel to lock the standard in position and having the roller wrists 7 adapted to engage the slots 8 to give the star wheel and the standard 3 a partial rotary movement. The index wheel 5 is provided with a worm wheel 9 with which a worm 10 on the shaft 11 engages, this shaft being driven continuously from any suitable source of power.

It is my purpose to have a series of mold arms carried by the standard 3 but inasmuch as they are all alike I have illustrated and will describe but one, it being understood that the others have simply a duplicate mechanism thereon, and that any desired number could be supported upon the standard 3.

12 is a gear wheel having a tubular hub 13 which engages in a bearing 14 near the upper portion of the standard 3. Secured to the gear wheel 12 at 15 is the mold arm 16. This mold arm is stiffened and supported by the brace or bracket 17 which at its inner end is likewise secured to the gear wheel 12. Between the bracket 17 and the arm 16 is a space which I utilize for the cams for operating the various parts as will be hereinafter described.

Figure 4:
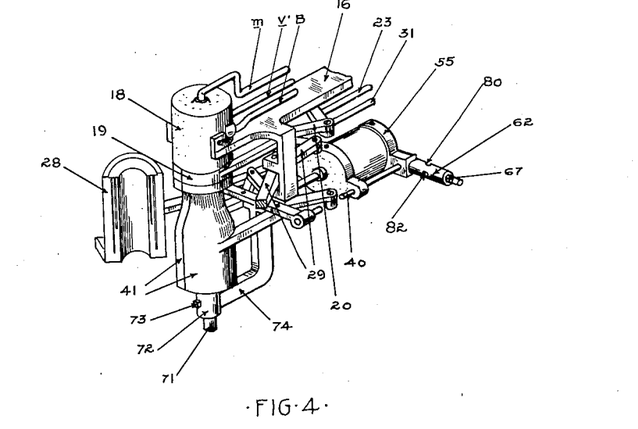
Fig. 4 is a perspective view of the operating parts at the end of one of the mold arms showing the blowing mold inclosed about the blank ready for blowing, and one section of the blank mold in its open position, the support for the other section being broken away so as to give a proper view of the operating parts.

At the outer end of the arm 16 (Figs. 1, 4 and 10) I carry the suction and blow head 18. Above the blow and suction head are the neck mold sections 19 which are supported respectively upon the outer end of the levers 20 pivoted in the brackets 21, the inner end of these levers having connected to them the links 22 which are pivoted together and to an actuating rod 23 which at its inner end has a roller wrist 24 engaging a camway 25 in the cam wheel 26 on the shaft 27. The levers 20 and 22 make a toggle which is actuated by the rod 23 to open and close the neck mold sections. They are shown in closed position in Figs. 1, 2, 4, 5, 6, and 10 and open position in Fig. 7.

Above the neck ring sections are the body blank sections 28 which are supported on the outer ends respectively of the levers 29 pivoted in the bracket 21, and having the links 30 which are pivoted to the ends of the levers and to each other, and are connected by the rod 31. At the inner end of the rod 31 is a roller wrist 32 engaging a camway 33 on the upper face of the cam wheel 26 on the shaft 27. The body blank sections will be opened and closed by this mechanism at the desired points in the operation of the machines, the cams and the drive mechanism therefor being properly timed as will be hereinafter explained.

Figures 2, 3, 5:
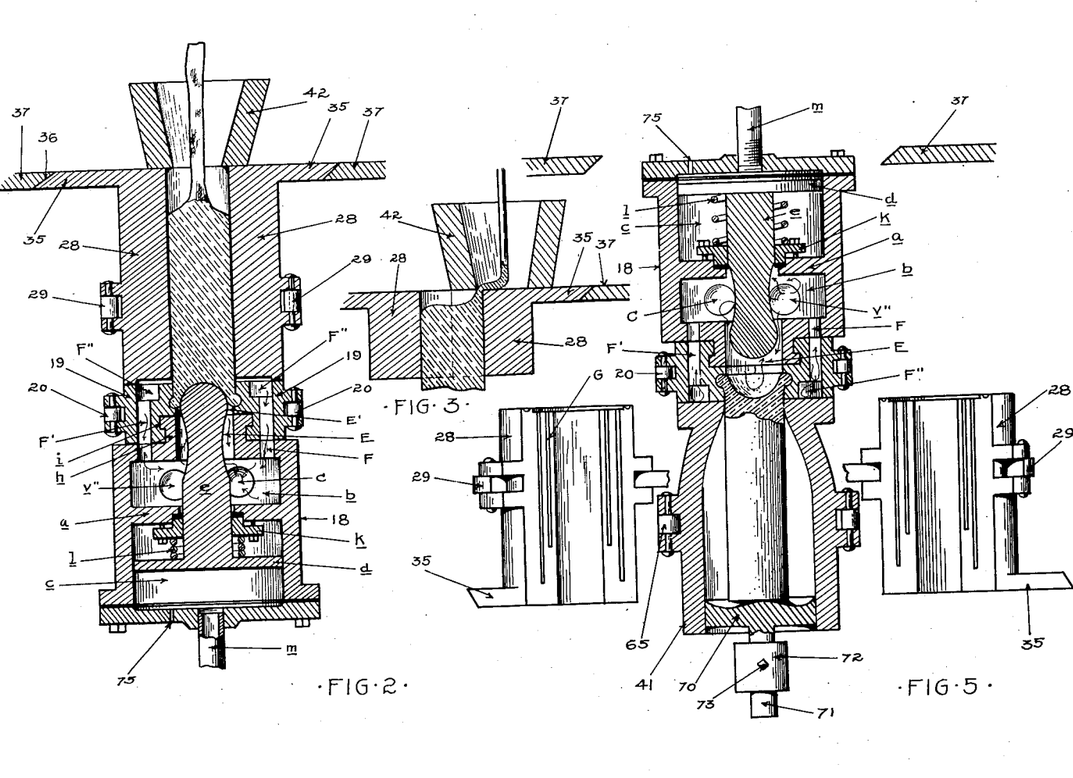
Fig. 2 is a vertical central section on line *x—x* Fig. 10 through the blowing blank mold, neck mold and the blowing and suction head showing the same in position for filling.
Fig. 3 is a section through the upper end of the same mold showing the same moving away from the filling position and cutting off the glass.
Fig. 5 is a section partly in elevation, of the blank suspended open position opposite the blowing mold. in position ready for the blowing operation which position is shown in Fig. 4, the sections of the blank mold being shown in their open position opposite the blowing mold.
Figures 6, 7:
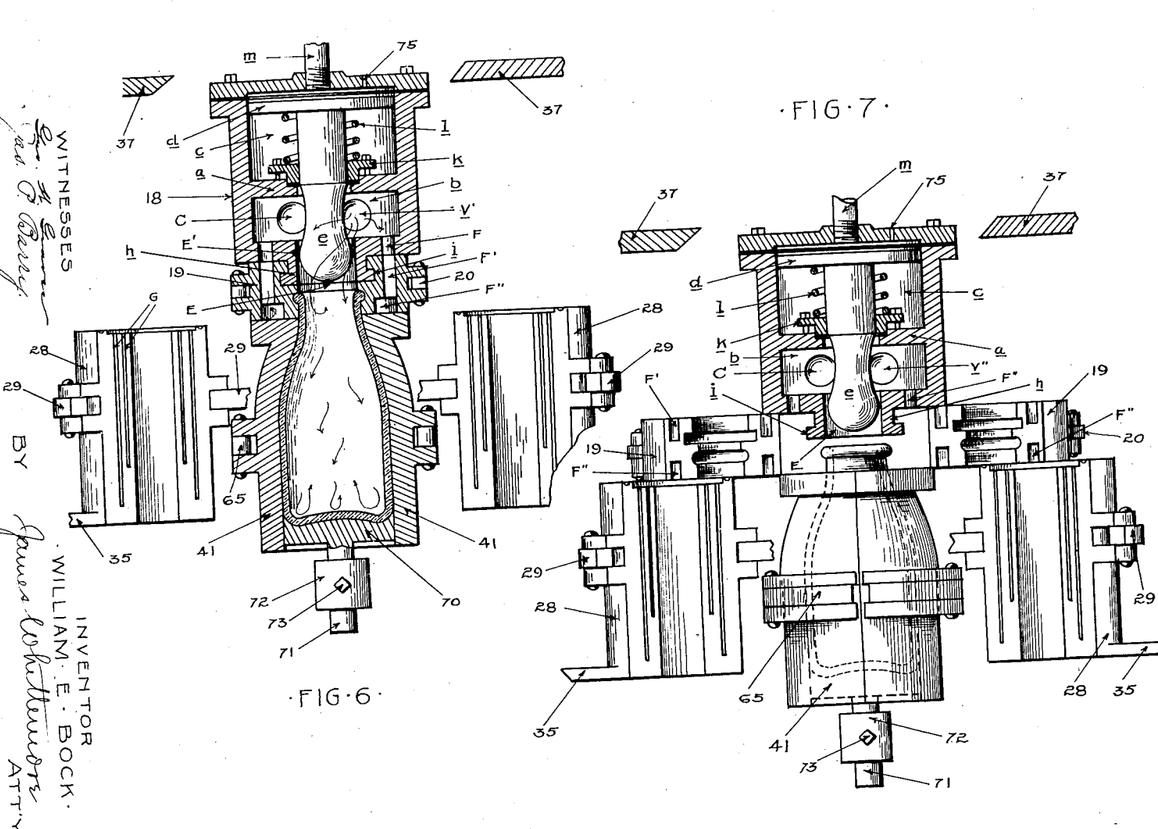
Fig. 6 is a similar section showing the article expanded in the blowing mold.
Fig. 7 is a sectional elevation of the parts shown in Figs. 5 and 6, the neck mold being open, the article finished and the body mold ready to lower and open to deliver the finished article.
Figure 10:
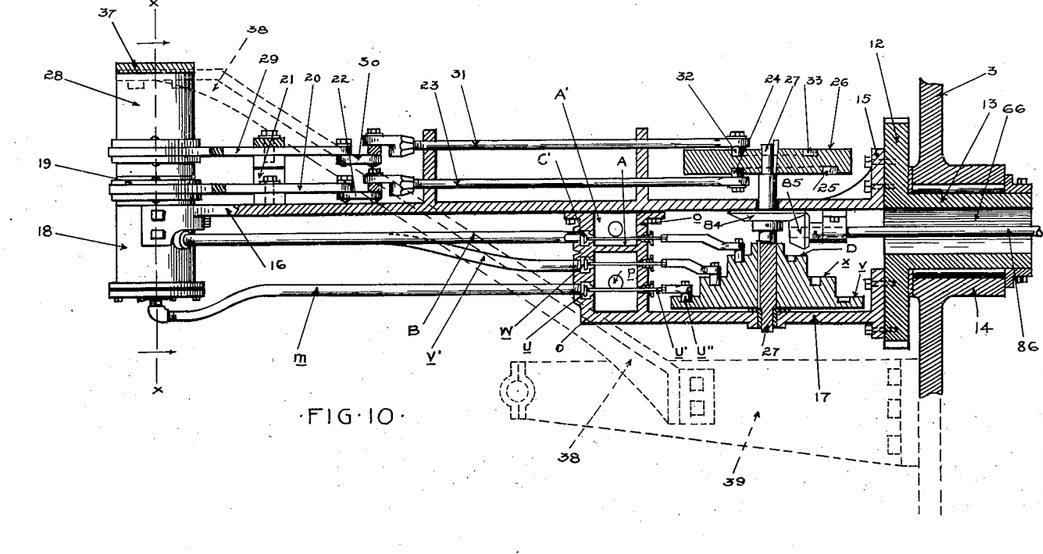
Fig. 10 is a section partly in elevation of one of the mold arms, showing the air chamber, cams, and the mechanism for operating the same.

The suction and blowing head shown in Figs. 2, 5 6 and 7 has the central partition $a$ which divides the head into two chambers $b$ and $c$ the chamber $c$ being in effect a cylinder in which is the piston $d$ upon which is the core plunger or pin $e$, the function of which is to form the indentation or the initial blow opening in the glass blank through which it may be blown. This pin projects through the flange $h$ at the upper end of the suction and blowing head and slightly into the neck mold. The flange $h$ is provided with an annular flange $i$ with which a corresponding recess in the sections of the neck mold engage as shown in Figs. 2 and 7. $k$ is a gland to hold the packing around the pin $e$ at the point where it passes through the partition $a$. $l$ is a spring between the gland and the piston $d$ acting to normally hold the piston away from the gland and to withdraw the pin out of operative position. The piston $d$ is operated by air under pressure admitted into the end of the cylinder $c$ through the pipe $m$. This pipe $m$ leads to the hollow casing $o$ shown in Fig. 10, and which is connected by means of a nipple $p$ to which is attached a branch of a flexible pipe $q$ more fully hereinafter described which leads to the interior of the hollow standard 3 where it is connected into a chamber $r$ in the casing $r'$ at the upper end of the hollow post as shown in Fig. 1. This casing is provided with air under pressure from the supply pipe $s$ which connects to a ring $s'$ on the outside of the casing $r'$. This ring has a sliding engagement with the casing $r'$ so that the casing may turn within the ring while the air connection and the ring remain stationary. $u$ is a valve controlling the exit from the casing $o$ into the pipe $m$. This valve is on a stem $u'$ which has a roller wrist $u''$ engaging the camway in the cam wheel $v$ on the shaft 27 the cam being so constructed as to open the valve at the proper moment, and to maintain it open when air under pressure is desired beneath the piston $d$ to raise it and the pin $e$ into the position shown in Fig. 2. The casing $o$ is connected with the chamber $b$ by means of a pipe $v'$ which connects into the port $v''$ in the mold head for the purpose at the desired point of admitting air under pressure into the chamber $b$ for blowing the article to form when the parts are in the position shown in Figs. 5 and 6. This air connection from the casing $o$ to the chamber $b$ is controlled by valve $w$ the stem of which is actuated by a camway in the cam $x$, on the shaft 27 (Figs. 1 and 10). The upper part of the casing $o$ is separated from the lower portion by a partition A and above the partition is the vacuum chamber A'. The chamber A' is connected to the chamber $b$ by a pipe B which connects to the port C in the mold head, and this vacuum connection is controlled by the valve C' which in turn is actuated by a camway in the cam D on the shaft 27 as shown in Fig. 10 to open and close the vacuum connection at the desired time. The chamber A' is connected with the vacuum chamber H formed below the chamber $r$ in the top of the standard 3, by a flexible pipe H', which I have shown broken away. The chamber H is connected to the exhaust pipe J by means of a pipe K extending through the chamber $r$. The exhaust pipe J is journaled in the casing $r'$ so that the casing may turn about the pipe J while the pipe remains stationary. The end of the core or pin $e$ which projects through the end of the suction and blowing head is slightly smaller than the opening through that head so as to make a passage E leaving a narrow annular port E' between the neck mold and the pin through which the air may be exhausted from the neck mold and the body blank mold, and still small enough to prevent the glass from flowing therein.

F are ports in the end of the suction or blowing head which register with passages F' in the neck mold which passages communicate with the annular groove F'' in the upper end of the neck mold which annular passage communicates with the vertical grooves G (Fig. 6) in the meeting faces of the sections of the blank mold for the purpose of taking up any leak of air which might otherwise pass through these joints during the time that the vacuum is on.

The body blank mold is provided at its free end with the lateral flanges 35 the flange upon one side being slightly longer than that upon the other side as shown in Fig. 2, and these flanges are beveled at their ends as shown at 36. These flanges abut at their outer ends with the ends of the ring sections 37. These ring sections extend between the mold arms and are carried on a rotating standard 3 by means of the arms 38 (Figs. 1 and 10) which are secured at their outer ends to the under side of the ring sections, and at their inner ends are secured to the brackets 39 which in turn are secured to the outer face of the standard 3 as plainly shown in Figs. 1 and 10. These brackets 39, I have shown in pairs near each mold arm, and they carry at their outer ends the frame 40 in which the blowing mold sections 41 are supported. I will describe the construction of the blowing molds and their operation later on. The ring sections 37 and the flanges 35 on the upper end of the body blank mold form in effect a continuous ring section or plate, which in the rotation of the standard 3 travels beneath the cup 42 supported on a standard 43. The bottom of this cup is formed by the ring sections 37 and the flanges 35 during the traveling movement of the standard 3.

Figure 8:
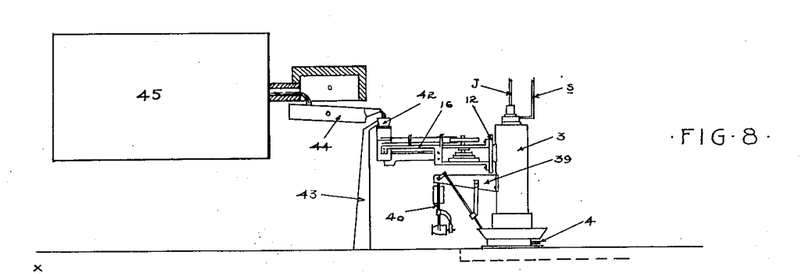
Fig. 8 is an elevation of the melting tank, the tilting pot or tank into which the continuous tank discharges and showing a diagram elevation of the machine to illustrate the relation of the melting and flowing tanks, and the machine in general view.

44 is a tank or pot adapted to contain molten glass which may be supplied thereto in any suitable manner but preferably is continuously supplied thereto from a continuous melting tank 45 which is shown in the diagram Fig. 8. The pot 44 is supported on the trunnions 46 (shown in dotted lines) journaled in standards 47. Upon the end of the trunnions is a worm wheel 48 with which meshes the worm 49, on the shaft 50, by means of which the tank or pot may be tilted to cause the glass to flow therefrom out of a spout 51 or if tilted backward to reduce the flow or cause the flow to cease entirely. The spout 51 is directly above the cup 42 so that when the pot is tilted to cause the glass to flow therefrom the flowing glass will fall directly into the cup 42 and rest upon the ring 37 during the traveling movement thereof.

In the periods of rest or stoppage of the standard 3 the body blank mold 28 will be stopped with its opening uppermost and directly in line with the opening through the cup 42 as shown in Fig. 2 so that the glass flowing from the tank, and so much of the glass as may have accumulated on the ring sections during the traveling movement between molds will fall into the body blank mold as shown in Fig. 2. It is intended that the flow of glass from the tank 44 will be regulated by the shaft 50 so that during the stopping period of the blank mold sufficient glass will flow from the tank into the mold to fill the same. As soon as the interval of rest ceases and the machine starts to bring another mold into operative relation to the flowing glass, the upper end of the blank mold will act to sever the glass flowing from the pot from that which is in the blank mold as shown in Fig. 3. At the time that the blank mold reaches the stopping point beneath the flowing glass as shown in Fig. 2 the valve C' is opened by the cam D and the air is drawn out of the chamber b in the suction head through the port C and also from the blank mold through the port or passage E and the port E' and the glass falling into the cavity of the blank mold will be forced therein by the atmospheric pressure above so as to fill the mold cavity and give shape to the blank as shown in Fig. 2. During the next movement of the standard 3 after the blank mold is filled as shown in Fig. 2, the glass is cut off as previously described and as shown in Fig. 3 the mold is moved with its charge of glass away from the tank and ready for the succeeding blowing operation. The blank mold remains in its inverted position at the second stopping point, and during the period that the mold which succeeds it in the position beneath the tank, is being filled. In going from the second stop to the third stop the blank mold is given a half rotation and this is accomplished by turning the entire mold arm 16 by rotating the gear wheel 12. This is accomplished by means of the rack 52 which slides in suitable guides on the standard 3, and at its lower end has a roller wrist 53 engaging a cam way 54 in the tubular stationary standard 2 as plainly shown in Fig. 1, the cam being so constructed that during this movement the rack will be reciprocated, and by its engagement with the gear wheel 12 will give that wheel a half rotation so as to allow the mold to be in the upright position. The blank remains suspended in the upright position at the third stopping point while the machine is standing still for the filling operation of a subsequent mold, and as it moves from the third stop to the fourth stopping point the sections of the blank mold 28 are opened. This is acomplished by the camway 33 operating on the roller wrist 32 which, through the connecting rod 31 and the toggles 30 and 29 will operate to cause these sections 28 to open to the position shown in Figs. 4, 5, 6, and 7.

As soon as the mold arm starts to travel from the third stopping point to the fourth stopping point, the blank molds open as above described and the blowing mold 41 starts to move upward and during the travel between stops is moved up into the position which the body blank mold held in relation to the blank which position is shown in Figs. 4, 5, 6, and 7. This is accomplished by the following mechanism. The frame 40 has a head 55 which has trunnions 62 at its end journaled in bearings 66, on the brackets 39. Secured to one end of one trunnion is a rock arm 57 to which is connected the rod 58 having a roller wrist 59 engaging in a camway 60 in the flange 61 secured to the tubular standard 2, the camway 60 being so shaped that at this point in the movement of the standard 3 it will rock the frame from its vertical position shown in Fig. 1 to a horizontal position shown in Fig. 4. During this upward movement the mold sections 41 will remain open until they have arrived at their uppermost position, at which point they are closed by the following means; 63 is a cylinder having a suitable piston (not shown) to which is connected the piston rod 64 which in turn connects to the toggles 65 at the outer ends of which the mold sections 41 are secured. Air under pressure being admitted into the inner end of the piston will operate the toggles in the outward movement of the piston rod to close the blowing mold section. The air is conveyed to the cylinder by the branch pipe $q$ from the air supply chamber $r$ which is inside the tubular standard 3 and passes out through an opening 66 in the center of the gear wheel 12, where it branches and one branch connects with the nipple 67 in the end of the trunnion 62 (Fig. 4) which leads through the trunnion to the ports 80 and 82. The other branch connects with the nipple $p$ as above stated. Port 80 connects with the pipe 81 leading to the inner end of the cylinder. This pipe connection is not shown throughout as it would interfere with the illustration of the other parts, but it is obvious I believe, from this description what the pipe connection is, and a portion of the pipe $q$ is shown in dotted lines in Fig. 1 as connected to nipple 67 from the end of the hollow trunnion 62. 70 is a bottom plate for the blowing mold which is carried on the stem 71 adjustably secured in the bearing 72 by means of a set screw 73 which bearing is carried at the outer end of the bracket 74 which is in turn secured to the underside of the frame 40, as shown clearly in Fig. 4. As soon as the blowing mold has inclosed the blank, and during this travel last described, and while the operation of changing the molds is occurring, the plunger $e$ for making the initial indentation in the blank is withdrawn. This is accomplished by means of the spring $l$ and by shutting off the air pressure which enters through the pipe $m$ below the piston $d$. This is accomplished as already described by means of the cam wheel $v$ and the cam groove therein operating the rod $u'$ and the valve $u$. As soon as this valve is closed the pressure of the spring will force out the air through a bleed opening 75 in the cylinder head as shown in Figs. 2, 5, 6, and 7. The next operation is that of expanding the blank in the blowing mold which is accomplished by admitting air through the ports $v''$ and pipe connection $v'$ the air passing from that port into the chamber $b$ and beside the pin $e$ as shown by the arrows in Figs. 5 and 6. The air for this blowing operation is controlled by the valve $w$ (Fig. 10) which in turn is controlled by the cam wheel $x$ which is connected to and operates the valve $w$, the cam in the wheel being so constructed as to open the valve at this point in the operation and admit air under pressure into the pipe $v'$ for blowing. The blowing operation continues during the period that the mold arm remains stationary and during a portion of the subsequent travel thereof, and the air is then shut off by a closing of the valve $w$ which is done by the further movement of the cam wheel $x$. The next operation is the opening of the neck mold to the position shown in Fig. 7. This is accomplished by the mechanism already described, to-wit, the cam wheel 26 having the camway 25, the roller wrist 24 engaging therewith the rod 23 and the toggles 22 and 20 respectively. The next movement is the lowering of the blowing mold with the contained bottle from the horizontal to the vertical position, and this is accomplished by means of the camway 60 in the flange 61 being so shaped as to move the rod 58 upwardly rocking the rock arm 57 which as previously described is connected to the trunnion of the frame 40 and lowers the body mold frame and the body mold with its contained bottle to the vertical position, at which time the mold sections 41 are opened. The mold sections 41 are opened by air admitted under pressure to the opposite end of the cylinder 63. This air is supplied from the pipe $q$ and enters through the end of the trunnion 62 and is carried into the cylinder through a port 82 which connects with the pipe 83 leading to the lower end of the cylinder, the cylinder head being provided at opposite ends with a bleed opening through which the air may be exhausted. Air being thus admitted through the pipe 83, through the piston rod, and the toggle levers described, the mold sections 41 are opened and the completed bottle is dropped out.

Motion is transmitted to the shaft 27 carrying the cam wheels v, x, D and 26 by means of the beveled gear wheel 84, on the shaft 27 with which the beveled pinion 85 meshes. This pinion is on the shaft 86 which is a horizontal shaft, and extends axially through the aperture 66, in the gear wheel 12, and through the corresponding aperture in the tubular standard 3 to the interior of that standard, where it is provided with beveled pinion 87, meshing with the beveled gear wheel 88 on the vertical shaft 89 which at its lower end has the beveled wheel 90 meshing in turn with the beveled pinion 91 on the horizontal shaft 92 which is suitably geared to the shaft 93 by means of the gear wheels 94 and 95. The upper end of the shaft 93 is provided with the worm wheel 9 which is driven by the worm 10 as previously described.

It will be seen from this description that glass flowing out from the tank or pot may flow in a continuous stream and that I may make bottles automatically and continuously from such flowing means.

Of course it is obvious that instead of having the glass flow continuously the operator can rock the tank or pot 44 to make the glass flow into the mold while it is stationary and to check or stop its flow between operations by a very slight tipping of the tank but this would require an operator which is not necessary if the flow is set to give the desired quantity.

I have referred to the body portion of the blank mold as the body blank mold but it is obvious that the so-called neck mold and the body blank mold together form a mold for forming a blank. If this mold is the shape of the finished article so that no further operation is required the entire article may be finished in this receiving or blank mold.

What I claim as my invention is,—

1. The combination with a tank or pot of molten glass having a discharge outlet from which the glass may flow, of a movable blank mold, mechanism for bringing the mold into such operative relation to the outlet of the tank or mold that the glass may flow thereinto, and means for exhausting the air from the mold while the mold is in receiving position.

2. The combination with a tank or pot of molten glass having a discharge outlet from which the glass may flow, of a movable blank mold, mechanism for bringing the mold into such operative relation to the outlet of the tank or mold that the glass may flow thereinto, means for exhausting the air from the mold while in the receiving position, and a cut off for severing the glass in the mold from the supply thereof.

3. The combination with a tank or pot of molten glass, having a discharge outlet from which the glass may flow, of a movable blank mold, mechanism for bringing the mold into such operative relation to the outlet of the tank or pot that the glass may enter therein, means for exhausting the air from the mold while in receiving position, a cut off for severing the glass and means for making an indentation or initial blow opening in the blank.

4. The combination with a tank or pot of molten glass, having a discharge outlet from which the glass may flow, of a movable mold having an upper body blank portion open at the top and a lower neck portion, mechanism for bringing the opening in the mold into such operative relation to the outlet from the tank or pot that the glass may enter therein, means for exhausting the air from the mold while in the receiving position, and a core or pin for forming an indentation or initial blow opening at the neck portion.

5. In a machine for making hollow ware, the combination of a movable blank mold having a fill opening, a pot or tank of molten glass having an outlet, means for moving the fill opening of the mold into operative relation to the outlet for the molten glass in the tank or pot to fill the mold, and means for causing the blank to assume the shape of the mold by differential pressure at opposite ends thereof, to thereby form a blowing blank or parison.

6. The combination with a tank or pot of molten glass having an outlet from which the molten glass flows, of a machine for making hollow ware, a movable blank mold having a fill opening, mechanism for moving the fill opening of the mold into filling relation to the outlet from the tank to fill the mold, mechanism for cutting off the glass in the mold, and means for causing the blank to assume the shape of the mold by differential pressure at opposite ends thereof to thereby form a blowing blank.

7. The combination with a device for feeding molten glass of a machine for receiving the glass from the supply and shaping it into hollow ware, comprising a series of blank molds, each consisting of a body blank mold having an open lower end, a neck mold below the same, means for bringing the molds with their open upper end into operative relation to the feeding device, and a cut off for the glass controlled by the traveling movement of the machine.

8. In a glass-shaping machine, the combination of the stationary receptacle 42, of the traveling ring sections, such as 37, and a series of blank molds between the sections.

9. In a glass shaping machine the combination of the stationary receptacle 42 of ring sections 37 of a series of blank forming molds between the sections, and flanges on the molds forming complementary sections of the ring for the purpose described.

10. The combination with a tank of molten glass having an outlet, of a mug or cup 42 under the outlet from the tank or pot, the movable ring sections 37 forming a bottom for the cup between the filling operations, and the blank forming molds between the ring sections.

11. In a glass-forming machine, the combination of the blowing head, the mold adapted to be connected thereto, a reciprocating pin or core in the blow head, adapted to enter the mold, a cylinder on the blow head, and a piston in the cylinder connected to the pin.

12. In a glass-forming machine, the combination of a traveling support, the blowing head thereon, a cylinder in the blowing head, a piston in the cylinder, a core or pin connected to the cylinder, a blank mold traveling with the head and adapted to be connected thereto, a spring for actuating the pin in one direction, and a valve-controlled air supply for moving the pin in the opposite direction.

13. In a glass-forming machine, the combination of a traveling support, the blowing head thereon, a cylinder in the blowing head, a piston in the cylinder, a core or pin connected to the cylinder, a blank mold traveling with the head and adapted to be connected thereto, a spring for actuating the pin in one direction, a valve-controlled air supply for moving the pin in the opposite direction, and automatic means for actuating the valve.

14. In a glass shaping machine, the combination of a mold carrying arm, a mold thereon having a body forming section and a neck forming section, the gear wheel 12 carrying said arm, a standard in which said wheel is journaled, and means for actuating the wheel to turn the mold arm and mold.

15. In a glass shaping machine the combination of a rotary standard, a mold carrying arm journaled to rotate in said standard, a mold thereon having a body section, and a neck section, of actuating devices for opening and closing both sections carried by the arm, and means for giving a rotational movement to said arm to turn the mold.

16. The combination with a tank or pot having an outlet from which the glass is adapted to flow of a glass shaping machine having a series of molds, means for moving the molds into operative relation to the outlet of the tank, and means for exhausting the air from each mold successively as it is brought into such operative or filling position with the outlet of the tank.

17. In a machine for making hollow ware, the combination of an inverted blowing-blank mold, mechanism for moving it into operative relation to a supply of molten glass, for filling the mold and forming a blowing-blank therein, mechanism for righting the mold, and for blowing the blank.

18. In a machine for making hollow ware, the combination of a mold having its fill opening uppermost, mechanism for moving the fill opening of the mold to and from beneath the outlet from a pot or tank whereby the glass from the pot will fall into the mold, means for shaping the glass into a blowing-blank, and coöperating mechanism for expanding the blank.

19. In a machine for making glassware the combination of a mold having a fill opening, mechanism for moving the fill opening in operative relation to glass flowing from a tank or pot, and a cut off operated by the movement of the mold.

20. In a machine for making glassware, the combination of a mold having a filling opening, mechanism for moving the filling opening in operative relation to glass flowing from the tank or pot, the mold in its movement relative to the pot or tank constituting the cut off for the glass flowing therefrom.

21. A glass working apparatus, comprising a glass tank having a glass outlet, a movable mold adapted to be supported below the opening and adapted to register therewith, means for severing the glass immediately above the mold, and means for forming a longitudinal cavity in the glass.

22. A glass working apparatus comprising a glass tank having a glass outlet, a movable mold adapted to be supported below and in communication with the outlet, said mold having open ends, one end of the mold receiving the glass from the tank, means for severing the glass at the receiving end of the mold, and means co-acting with the opposite end of the mold for forming a longitudinal cavity in the blank at that end of the mold.

23. A glass working apparatus comprising a tank having a glass outlet, a movable mold adapted to be supported below and in communication with the outlet, said mold having open ends, one end receiving the glass, and a suction device co-acting with the opposite end of the mold to assist in filling the mold.

24. A glass working apparatus comprising a glass tank having a glass outlet, a plurality of separated movable molds adapted to be supported below in communication with said outlet, and plates located in a plane with the filling face of the molds and spanning the space between them to close the tank outlet when the molds are moved.

25. A glass working apparatus, comprising a glass tank having a glass outlet, a rotatably supported frame having a series of molds adapted to be brought below and in communication with said outlet, each mold having a shearing action in combination with the tank, and plates located in a plane with the upper end of the molds and spanning the space between them to close the tank outlet when the molds are moved.

26. A glass working apparatus, comprising a glass tank having a glass outlet, a rotatably supported frame having a series of molds adapted to be brought below and in communication with said outlet, each mold having a shearing action in combination with the tank, plates located in a plane with the upper end of the molds and between the same, and plates cast integral with the molds and in a plane with the upper ends thereof and forming a continuation of the plates between the molds.

27. The combination with a tank or pot having an outlet from which the glass is adapted to flow, of a machine for shaping hollow ware; an inverted blank mold therein; mechanism for moving it into operative relation to the supply from the tank and forming a blank therein; mechanism for cutting off the supply of glass from the mold, for righting the mold for opening the lower part of the blank mold; a blowing mold adapted to inclose the blank; and means for admitting air to the blank to blow the same in the blowing mold.

28. The combination with a tank or pot having an outlet from which the glass is adapted to flow, of an automatic machine for shaping hollow ware; an inverted blank mold therein; mechanism for automatically moving it into relation to the supply from the tank and forming a blank therein; mechanism for automatically cutting off the supply of glass from the mold, for righting the mold for opening the body part of the blank mold; a blowing mold adapted to automatically inclose the blank; and means for admitting air to the blank to blow the same in the blowing mold.

29. The combination with means for charging a blank mold with molten glass by gravity direct from the tank, and an automatic cut-off therefor, of a traveling inverted mold for receiving the charge and in which a blank is formed; and automatic means for righting the mold and for blowing the blank.

In testimony whereof I affix my signature in presence of two witnesses.

WILLIAM EMIL BOCK.

Witnesses:
E. H. CLOSE,
WM. S. WALBRIDGE.